United States Patent [19] [11] 4,065,543
Sare et al. [45] Dec. 27, 1977

[54] CATALYTIC OXIDATION OF $C_2$-$C_4$ HALOGENATED HYDROCARBONS

[75] Inventors: Edward J. Sare, Clinton; Jerome M. Lavanish, Akron, both of Ohio

[73] Assignee: PPG Industries, Inc., Pittsburgh, Pa.

[21] Appl. No.: 742,045

[22] Filed: Nov. 15, 1976

Related U.S. Application Data

[63] Continuation-in-part of Ser. No. 647,687, Jan. 9, 1976, abandoned.

[51] Int. Cl.$^2$ ............................................. B01D 53/34
[52] U.S. Cl. .................................... 423/240; 423/245; 423/481
[58] Field of Search ............... 423/240, 241, 245, 481, 423/488, 502

[56] References Cited
U.S. PATENT DOCUMENTS

| 3,972,99 | 8/1976 | Kageyama | 423/240 |
|---|---|---|---|
| 3,845,191 | 10/1974 | Bruce, Jr. | 423/240 |

FOREIGN PATENT DOCUMENTS 1,333,650   10/1973   United Kingdom ................. 423/240

*Primary Examiner*—Earl C. Thomas
*Attorney, Agent, or Firm*—Irwin M. Stein

[57] ABSTRACT

$C_2$-$C_4$ halogenated, e.g., chlorinated and brominated, hydrocarbons, such as vinyl chloride, present in a gas stream are removed therefrom, e.g., incinerated, by contacting the gas stream with an oxygen-containing gas in the presence of cobalt oxide catalyst at relatively low temperatures, e.g., 100° C. Commonly, the halogenated hydrocarbon is present in the gas stream to be treated in small amounts, e.g., less than 0.05 weight percent. The temperature of treatment can vary, e.g., from 20° to 500° C., and can be adjusted within said range depending on the relative humidity of the gas stream treated to maintain catalytic activity. Preferably, treatment occurs under conditions of low relative humidity, e.g., less than 5 percent, and the catalyst is a hydrated cobalt oxide catalyst.

22 Claims, No Drawings

CATALYTIC OXIDATION OF $C_2$–$C_4$ HALOGENATED HYDROCARBONS

CROSS REFERENCE TO RELATED APPLICATIONS

This application is a continuation-in-part application of our earlier filed copending application U.S. Ser. No. 647,687, filed Jan. 9, 1976, and how abandoned.

DESCRIPTION OF THE INVENTION $C_2$–$C_4$ halogenated, e.g., chlorinated and brominated hydrocarbons are used commercially in many applications. For example, vinyl chloride and vinylidene chloride are used to prepare useful polymers and copolymers. Other chlorinated $C_2$-hydrocarbons, such as methyl chloroform (1,1,1-trichloroethane), and trichloroethylene are useful as solvents and are employed in metal degreasing. Ethylene dichloride and ethylene dibromide are used in gasoline as part of lead anti-knock formulations.

Recently, vinyl chloride has been reported to be a suspected carcinogen and consequently human exposure levels have been severely restricted. In areas where vinyl chloride is made or used, e.g., polymerized, gas process streams may be produced containing relatively small but still objectionable quantities of vinyl chloride which cannot be recovered economically. Such process streams may include vents connected to process equipment, such as reactor stripper, condenser and drier vents, storage vessel vents, and area vents, e.g., reactor building vents. Thus, a need exists for a method for destroying or reducing significantly the vinyl chloride content of such gas streams. A similar need may exist for gas process streams containing other $C_2$, $C_3$ and $C_4$ chlorinated and brominated hydrocarbons.

It has been reported that certain chlorinated hydrocarbons such as methyl chloroform, vinylidene chloride, trichloroethene, tetrachloroethene, and chloroform are susceptible in varying degrees to Hopcalite-catalyzed decomposition with humidified air (about 50 percent relative humidity) at temperatures in excess of 300° C., e.g., 305°–415° C. See, for example, the articles "Catalytic Combustion of Atmospheric Contaminants Over Hopcalite" by J. G. Christian et al, Int. J. Air Wat. Poll. Pergamon Press 1965, Vol. 9, pp. 1–10, "Catalytic Decomposition of Halogenated Hydrocarbons over Hopcalite Catalyst" by J. K. Musick et al, Ind. Eng. Chem., Prod. Res. Develop., Vol. 13, No. 3, 1974, pp. 175–179.

It has now been discovered that the $C_2$–$C_4$ halogenated, e.g., chlorinated and brominated, hydrocarbon, e.g., $C_2$-chlorinated and brominated hydrocarbon, content of gas streams, e.g., air streams, containing same, can be reduced substantially by contacting such halogenated hydrocarbon with oxygen-containing gas in the presence of cobalt oxide catalyst at temperatures of from 20° to 500° C., e.g., 80°–100° C. Temperatures in the lower portion of the range, e.g., from room temperature, i.e., 20°–23° C. to 80° C. have been found effective for short periods of time. Temperatures higher than 100° C., e.g., 100°–300° C., are especially useful. More particularly, it has been found tht $C_2$-chlorinated hydrocarbons, such as vinyl chloride, vinylidene chloride, methyl chloroform and trichloroethylene, can be removed from gas streams, e.g., air, containing same at relatively mild temperatures in the presence of hydrated cobalt oxide catalyst and under conditions of low relative humidity, e.g., less than 5 percent (measured at 23° C.). The exact mechanism by which the $C_2$–$C_4$ halogenated hydrocarbon is removed from the gas stream is not known with absolute certainty; but, from the evidence at hand, it is believed that oxidative decomposition (incineration) is a principal mechanism. Other mechanisms, e.g., dehydrochlorination, may also play a part in the removal of such halogenated hydrocarbons from the gas stream.

The temperature at which the process of the present invention is conducted can vary within the aforesaid range of 20°–500° C. and, typically will be regulated within said range depending on the relative humidity of the gas streams in contact with the catalyst, i.e., the the relative humidity of the reaction zone, e.g., incineration zone, to achieve significant catalytic activity. Under conditions of low relative humidity, temperatures on the low side of the aforesaid range, e.g., 20°–110° C. can be used. For example, at a relative humidity of less than 2 weight percent, the vinyl chloride content of a synthetic gas stream can be reduced substantially, e.g., from about a 50 ppm level to non-detectable levels (0.5 ppm), at temperatures of 100°–110° C., e.g., 104° C., when using a hydrated cobalt oxide catalyst and a synthetic gas flow rate over the catalyst of 9 liters per hour. When the relative humidity of the gas stream is higher than 5 weight percent, temperatures higher than 110° C. may be required to maintain catalytic activity under similar conditions.

DETAILED DESCRIPTION $C_2$–$C_4$ halogenated hydrocarbons to which the process of the present invention can be applied are chlorinated and brominated hydrocarbons containing from two to four carbon atoms and from 1 to 4, preferably 1 to 3, more preferably no more than 2, halogen atoms per molecule. Examples of such halogenated hydrocarbons include: vinyl chloride, vinylidene chloride, methyl chloroform (1,1,1-trichloroethane) 1,1,2-trichloroethane, trichloroethylene, perchloroethylene, vinyl bromide, vinylidene bromide, dichloroethane, ethylene dichloride, ethylene dibromide, propyl chloride, propyl bromide, isopropyl chloride, 1-, 2-, and 3-chloro-propene, 1,2- and 2,3-dichloro-propene, allyl chloride, epichlorohydrin, chloroprene, butylene dichloride, etc. Preferably, the ratio of hydrogen to halogen atoms in the halogenated hydrocarbon is at least one. Preferred are unsaturated $C_2$-halogenated hydrocarbons, i.e., vinyl compounds and incompletely halogenated derivatives of ethylene. The process described herein is deemed particularly applicable to $C_2$-chlorinated hydrocarbons such as vinyl chloride, vinylidene chloride, methyl chloroform, and trichloroethylene.

As the cobalt oxide used in the present process there can be mentioned cobaltous oxide, cobaltic oxide, cobaltic hydroxide and mixures of such oxides. Such oxides can also be referred to as cobalt (II) oxide (CoO), cobalt (III) oxide ($Co_2O_3$), and cobalt (II, III) oxide ($Co_3O_4$). Preferably cobalt oxide in the higher oxidation state, i.e., cobalt (III) oxide or the mixed oxidation state, i.e., cobalt (II, III) oxide, is used. The term "cobalt oxide", as used in this specification and claims, (unless otherwise indicated) is intended to mean and include any one of the aforementioned oxides or combinations of such oxides.

The cobalt oxide content of the active portion of the catalyst is typically at least 70 or 75 weight percent, disregarding catalyst supports, preferably at least 80, e.g., 85 weight percent. The remainder of the catalyst can be minor amounts of other metal compounds, e.g., metal oxide impurities that do not interfere significantly with the catalytic function of the catalyst, and water of hydration. Metal oxide impurities can be incorporated during preparation of the catalyst or be present in the reactants used to prepare the catalyst.

It is believed from the evidence at hand that some water of hydration associated with the cobalt oxide catalyst is beneficial vis a vis, the catalytic activity of the catalyst in the process described herein. For example, it has been observed that a cobalt oxide catalyst which had little, if any water of hydration was catalytically less active than a cobalt oxide catalyst having significant water of hydration. The presence or absence of water of hydration is related to the temperature seen by the surface of the cobalt oxide catalyst during its preparation or use. For example, cobalt oxides prepared by thermal decomposition of a cobalt salt at temperatures greater than 500° C., e.g., 530° C., can have little water of hydration associated with the resulting cobalt oxide and hence would be expected to have little catalytic activity at the lower temperatures utilized in the present process.

The total quantity of water associated with the cobalt oxide as water of hydration can vary depending on the particular cobalt oxide or mixtures of cobalt oxides used, and the method of cobalt oxide preparation. In particular, the drying conditions used in the cobalt oxide preparation can vary and thereby effect the amount of water of hydration present. It has been found that cobalt oxide catalyst having an amount of water of hydration at least as high as that obtained by drying an aqueous filter cake of precipitated cobalt oxide or cobalt oxide mixture at 200° C. for a time sufficient to reach equilibrium is a satisfactory hydrated cobalt oxide catalyst. Such a temperature is sufficient to remove substantially all of the phase water present in the filter cake without excessive loss of water of hydration. Higher drying temperatures can be used; however, care should be exercised at higher temperatures to prevent significant loss of water of hydration and avoid loss of the beneficial effect obtained by its presence.

The effect of the water of hydration of the cobalt oxide catalyst can be determined best by utilizing the cobalt oxide as an incineration catalyst, e.g., a vinyl chloride incineration catalyst, and observing the catalyst's activity as evidenced by reduction of the halogenated hydrocarbon content of the gas stream treated, a simple expedient for one skilled in the art. As used herein, particularly useful hydrated cobalt oxide catalysts are those that are capable of removing at least 70, e.g., 80, percent of the vinyl chloride present in an air stream containing about 50 ppm vinyl chloride under conditions of less than one percent relative humidity (measured at 23° C.), a reactor temperature of 104° C. a gas flow rate over the catalyst of 9 liters per hour, a catalyst bed L/D ratio (depth of catalyst bed/diameter of catalyst bed) of at least two, and an average residence time in contact with the catalyst of 10 seconds. The average residence time is the value obtained by dividing the volume of catalyst by the volumetric rate of flow through the catalyst. Preferably, at least 90 percent and most preferably substantially all, i.e., non-detectable levels in the gas effluent, of the vinyl chloride is removed from the air stream under such conditions.

The cobalt oxide catalyst can be used in an unsupported form or can be supported on an inert substrate. By "inert" is meant that the substrate is chemically inert to the cobalt oxide catalyst deposited thereon and chemically resistant to the components of the halogenated hydrocarbon-containing gas stream, e.g., vinyl chloride-containing gas stream, and the oxidation products resulting therefrom. Examples of suitable inert substrates include: asbestos, pumice, activated charcoal, silica gel, colloidal silica, fumed silica, activated alumina, and clays. The activity of the supported cobalt oxide catalyst can vary depending on the method of preparation. For example, a mechanical mixture of cobalt oxide and the support is commonly more active than a suppot impregnated with catalyst. Heating of the supported catalyst to high temperatures can deactivate the catalyst by sintering the cobalt oxide, sintering the support to form a mass transfer barrier, or cause reaction between the catalyst and the support. For example, heating cobalt oxide supported on alumina to 850° C. is reported to result in the formation of the catalytically inactive cobalt aluminate ($CoAl_2O_4$). See, "The Oxidation of Hydrocarbons and CO over Metal. III $Co_3O_4$" by Yung-Fang Yu Yao, *Journal of Catalysis*, 33, pp 108–122 (1974). When used in a supported form, the amount of catalyst placed on the support should be sufficient to catalyze incineration of the $C_2$–$C_4$ halogenated hydrocarbon, i.e., a catalytic amount. The catalytic amount of catalyst and inertness of the support on which the catalyst is placed can be determined by one skilled in the art by routine experimentation.

The cobalt oxide catalyst can be prepared in any number of ways well-known to those skilled in the art of catalyst preparation. For example, cobalt oxide catalyst can be prepared by precipitating the hydroxide from a solution of cobalt salt. The precipitate is then dried to remove phase water and partially dehydrate the hydroxide and form the oxide. Typically, drying is performed at temperatures of from 100°–200° C. When a catalyst support is used, the cobalt hydroxide can be precipitated directly onto the support. In addition, the cobalt oxide catalyst can be prepared by thermal decomposition of other suitable oxygen-containing anion salts of cobalt, e.g., nitrates, carbonates and oxalates. Preferably, thermal decomposition should not be conducted at temperatures which dehydrate completely the cobalt oxide. The surface area of the cobalt oxide catalyst prepared can vary; but, as in most catalyst applications, relatively high surface areas are preferred.

In the event the cobalt oxide catalyst becomes deactivated through use (but not permanently poisoned), it is possible to regenerate the catalyst by passing a dehumidified, i.e., less than 5, preferably less than about 2, e.g., less than 1, percent relative humidity gas stream containing oxygen, e.g., as provided by air, oxygen, or oxygenenriched air, in intimate contact with the catalyst at elevated temperatures, e.g., about 150° to 200° C., in the substantial absence of contaminating gases, e.g., hydrogen halide (hydrogen chloride), $C_2$–$C_4$ halogenated hydrocarbons (vinyl chloride) and high levels of water vapor. The catalyst is contacted with oxygen for a period of time sufficient to regenerate the catalyst, e.g., from 0.5–10 hours. The exact amount of time will of course be dependent on the amount of catalyst, its level of deactivation, temperature of treatment, and volumetric rate of flow through the catalyst bed. The totally regenerated catalyst appears from the data at hand to be as efficient as freshly prepared catalyst.

The process described herein results in the removal of $C_2$–$C_4$ halogenated hydrocarbons, e.g., $C_2$-chlorinated hydrocarbons, from a gas stream containing same. The extent to which the aforesaid halogenated compounds are removed from the gas stream is dependent on the conditions of treatment and the particular halogenated compound(s) to be removed. From the evidence at hand, removal appears to be accomplished principally by oxidative decomposition (incineration). Adsorption may play a part in the removal at temperatures significantly below the boiling point of the halogenated hydrocarbon. Dehydrochlorinate may also be a mechanism which is occuring in the reaction zone. It is not known for certain at this time to what extent the latter two mechanisms may participate in the removal process. Therefore, the term "incineration", as used in this specification and claims, is intended to mean and include oxidative decomposition alone or in combination with one or both of the other two aforementioned mechanisms.

In accordance with the present process, $C_2$–$C_4$ halogenated hydrocarbons, e.g., chlorinated hydrocarbons such as vinyl chloride, are catalytically oxidized at temperatures between about 20° C. and about 500° C., e.g., 20°–300° C. Temperatures less than 300° C., e.g., from 50° C. to 250° C. are suitable. At the lower temperatures, e.g., 20°–50° C., catalytic activity falls off rapidly with time; however, in applications such as in gas masks, even a few moments of activity can be important. Temperatures between about 80° C., or 100° C. and about 250° C., e.g., between about 100° and 150° C., are deemed to be particularly economically desirable. The use of such fairly moderate temperatures, e.g., temperatures of about 100°–115° C., to achieve incineration of the described halogenated hydrocarbons is surprising since significantly higher temperatures are commonly used to incinerate such materials by a non-catalytic process. Consequently use of moderate incineration temperatures can represent a significant savings in heat energy. Further, an incineration process that operates at about 100° C. can utilize low pressure waste steam which is readily available in chemical process plants; and, therefore, such process offers significant further economic advantages. Temperatures in the range of about 100°–150° C., or 200° C., are preferred because such temperatures assist in the removal of the products of oxidation, e.g., hydrogen chloride, carbon dioxide and water, from the surface of the catalyst.

The aforesaid temperatures are reactor temperatures as described in the Examples following, i.e., the temperature of the gas stream above the catalyst bed. The temperatures of the catalyst surface are believed to be slightly higher than the reactor temperature because of the heat of incineration produced by oxidative decomposition of the halogenated hydrocarbons on the catalyst surface.

The particular incineration temperature selected may depend on the relative humidity of the gas streams entering the reactor containing the cobalt oxide catalyst. Although from the evidence at hand, cobalt oxide appears to be moderately resistant to inhibition by water, water vapor, i.e., the humidity of the gas streams contacting the catalyst does tend to diminish the activity of the cobalt oxide catalyst. This lowering of activity is more pronounced at low temperatures, e.g., 20°–110° C. Therefore, higher temperatures are required to obtain a particular level of catalyst activity with a humidified gas stream than when operating with a substantially dry gas, i.e., a gas stream having low relative humidity.

As used herein, the relative humidity of a gas stream is the value reported as measured at room temperature (23° C.) and ambient pressure (745 millimeters of mercury). By low relative humidity is intended to mean less than about 5, e.g., less than 2, percent.

The activity of the cobalt oxide catalyst used in the present process can be expressed in terms of its efficiency at the conditions of incineration, i.e., the percent of $C_2$–$C_4$ halogenated hydrocarbon removed from the gas stream after conditions become constant. The efficiency of the catalyst can be determined by the expression:

$$(C_i - C_f) \, 100 \, / C_i$$

wherein $C_i$ is the initial concentration of the halogenated hydrocarbon in the gas stream and $C_f$ is the final concentration. Thus, the higher the efficiency of the catalyst, the higher is its "activity."

As indicated, the extent of inhibition of the activity of the cobalt oxide catalyst by water vapor is temperature dependent. The lower the temperature of incineration, the more pronounced the lowering of catalyst activity. Consequently, for any desired level of catalyst activity, it is possible to either regulate the relative humidity of the gas stream to be treated or the temperature at which treatment is conducted. Thus, the reactor temperature is maintained at a level within the aforesaid described range to inhibit reduction or loss of the cobalt oxide catalyst activity by the moisture content of the gas streams contacting the catalyst. The level of catalyst activity may vary depending on the halogenated hydrocarbon to be removed from the stream, the initial concentration of the halogenated hydrocarbon and the final concentration thereof in the treated stream required by subsequent process treatment, government regulation, etc. It is therefore impossible to set a minimum acceptable level of catalyst activity since such a level is determined by the desires and needs of the operator. However, one skilled in the art, with the information provided herein, can select those operating conditions required to provide the catalyst activity desired.

Generally, the higher the incineration temperature and the lower the relative humidity of the entering gas streams, the higher the catalyst's activity. Therefore, when the amount of heat energy available for incineration or materials of construction limit the incineration temperature to a particular range, the relative humidity of the combined gas streams contacting the catalyst is maintained at a level within said range which will maintain catalyst activity at the desired level. On the other hand, if available heat energy or materials of construction do not limit the incineration temperature, the incineration temperature can be adjusted (usually upwards) to offset the adverse effect of moisture on the catalyst activity. Thus, within the temperature range of 20°–500° C., e.g., 50°–300° C., either the temperature of incineration or relative humidity of the treated gas streams or both are regulated or maintained at a level at which the degree of catalyst activity reaches the desired magnitude. For example, when the incineration temperature is less than about 110° C. it is expected that the relative humidity will be kept at least 5 percent, e.g., 2 percent and preferably less than 1 percent.

The above-described effect that water vapor has on the activity of the catalyst can be described as a reversible poisoning or inhibition to distinguish the effect from an irreversible poisoning, such as the effect of sulfur compounds on noble metal catalysts, reaction of the catalyst surface, etc. In those cases, the effect on the catalyst is not generally reversible without reworking the catalyst. As the data presents in the Examples show, the reduced efficiency of the catalyst due to an increase in the level of water vapor in the gas stream is reversed by lowering the relative humidity of the gas stream to its former level.

In one embodiment of the present process, the gas stream to be treated is dehumidified to a desired relative humidity level and then incineration at temperatures within the range described hereinbefore. The $C_2$-$C_4$ halogenated hydrocarbon-containing gas stream can be dehumidified, if necessary, by passing it through a drying column containing a desiccant. Either solid or liquid desiccants can be used to remove water vapor from the gas stream. Examples include: silica gel, activated alumina, fused anhydrous calcium sulfate, lime, magnesium perchlorate, calcium chloride, potassium hydroxide, sulfuric acid, lithium chloride solutions and ethylene glycol. The drying of gases is well-known, for example, in the chemical process industry. Thus, use of solid desiccants in gas masks to take up water vapor is well known also. The means for achieving such drying is not critical to the practice of the present invention.

The amount of oxygen used in the oxidation of the $C_2$-$C_4$ halogenated hydrocarbons in accordance with the present process should be in an amount that is sufficient to incinerate (oxidize) that quantity of $C_2$-$C_4$ halogenated hydrocarbon contained in the gas stream, i.e., an incinerating (oxidizing) amount, that is necessary to reduce the halogenated hydrocarbon content of the gas stream to the desired level. The amount oxygen should be at least stoichiometrically sufficient to oxidize substantially all of the carbon content of the halogenated hydrocarbon to carbon dioxide and preferably sufficient to oxidize both the carbon content and available hydrogen content of the halogenated hydrocarbon to carbon dioxide and water, respectively. With respect to vinyl chloride, the stoichiometric amount of oxygen is obtained from the following balanced equation:

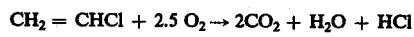

$$CH_2 = CHCl + 2.5\ O_2 \rightarrow 2CO_2 + H_2O + HCl$$

The calculated heat of reaction for the reaction for the reaction represented by the reaction of the aforesaid equation is about 270 kilocalories per mole of vinyl chloride.

Generally the amount of oxygen used will be far in excess of the stoichiometric amounts required in order to insure substantially complete oxidative decomposition of the halogenated hydrocarbon compound. The amount of oxygen used is not critical provided that sufficient quantities are made available to accomplish the aforesaid described degree of oxidation. The oxygen can be provided by utilizing air, oxygen, or oxygen-enriched air. The oxygen-containing stream, if separate from the $C_2$-$C_4$ halogenated hydrocarbon-containing stream, can also be dehumidified (in the manner described) to a low relative humidity before being mixing with the aforesaid halogenated hydrocarbon-containing stream.

In carrying out one preferred embodiment of the process of the present invention, the $C_2$-$C_4$ halogenated hydrocarbon-containing gas stream is dehumidified, if necessary, and mixed with dehumidified oxygen-containing gas (if used) and introduced into a preheater. In the event the $C_2$-$C_4$ halogenated hydrocarbon-containing gas stream is sufficiently dry or already contains sufficient quantities of oxygen, no additional drying or mixing with an oxygen-containing stream is required. This may well be the situation in the latter case where an area in which the $C_2$-$C_4$ halogenated hydrocarbon may be present is well ventilated and the exhausted vent gas process stream is to be treated in accordance with the present invention. The dehumidified oxygen-containing process stream that also contains $C_2$-$C_4$ halogenated hydrocarbon is preheated, if necessary, and the heated gas stream introduced into a catalytic reactor in which the cobalt oxide catalyst has been placed, e.g., as a fixed or fluid bed. Preheating should be conducted to the approximate temperature at which incineration is to be conducted, i.e., the reactor temperature. While preheating can be performed before dehumidification, this is not desirable economically.

According to known techniques, the catalyst bed diameter in an integral fixed-bed flow-type catalytic reactor should be at least six times, and bed depth at least 30 times the effective catalyst particle diameter to keep the bed edge and end effect suitably small. The preheated gas stream is maintained in contact with the cobalt oxide catalyst for a time sufficient for the incineration reaction to occur. Contact times of from about 2 to 10 seconds at 100° C. and under conditions of low relative humidity have been found to be sufficient. The gas stream exiting from the catalytic reactor(s) is reduced in its $C_2$-$C_4$ halogenated hydrocarbon content. Preferably, the gas stream exiting from the reactor or reactors contains less than 10 ppm, e.g., less than 5 ppm, and, more preferably, less than 1 ppm of $C_2$-$C_4$ halogenated hydrocarbon, and is cooled prior to disposal. It is advantageous to pass the reactor effluent stream through, for example, a caustic scrubber to remove hydrogen halide, e.g., hydrogen chloride or hydrogen bromide which are oxidation or dehydrohalogenation products before disposing of the other innocuous gas products. While only one catalyst bed has been described more than one such bed can be used. For example, multiple separate beds in sequence can be used. Such beds can be in one unit, e.g., stacked beds, or in separate units.

Apparatus in contact with the $C_2$-$C_4$ halogenated hydrocarbon gas stream and incineration products thereof is constructed typically from acid resistant construction materials to minimize corrosion problems. Examples of metallic construction materials include monel, nickel, and stainless steel. Acid resistant engineering plastics, such as Teflon (a trademark of E. I. duPont deNemours and Company for polytetrafluoroethylene) and Ryton (a trademark of Phillips Petroleum Company for polyphenylene sulfide resins) can be used in the construction of the apparatus as a result of the low temperatures that can be used in the practice of the oxidation process described herein.

The present process is more particularly described in the following Examples which are intended as illustrative only since numerous modifications and variations therein will be apparent to those skilled in the art.

EXAMPLE I

A solution of 70.5 grams of cobalt (II) sulfate heptahydrate dissolved in 200 grams of distilled water was added slowly to a solution of 35 grams of anhydrous sodium hydroxide dissolved in 70 grams of distilled water with vigorous stirring. After addition of approximately 25 grams of distilled water to reduce the viscosity of the paste-like precipitated reactant mass, 10.9 grams of a 35 weight percent aqueous solution of hydrogen peroxide was added slowly in approximately 0.5 ml aliquots to the skill viscous, hydrous cobalt oxide suspension with vigorous stirring. After completing the addition of the hydrogen peroxide solution, the reactant mixture was stirred for a period of approximately 15 minutes. The precipitate was then washed thoroughly with distilled water using a centrifuge and isolated by filtration. The wet filter cake was pressed between felt pads using a hydraulic press. The pressed filter cake was then dried at a temperature of approximately 50° C. for a period of approximately 2⅔ days. The partially dried filtered cake was broken up with a mortar and pestle to a minus 4 mesh particle size and dried at approximately 200° C. for a period of 7 hours. The dried product was then screened to remove the minus 20 mesh fines and the minus 4, plus 20 mesh particle size fraction was then redried at approximately 200° C. for a period of 6 hours. The cobalt content was determined to be 83.3 percent as cobalt (II) oxide by elemental X-ray diffraction analysis of the oxide indicated that a crystalline phase was present which was identified as hydrated cobalt (III) oxide. Thermogravimetric analysis of a sample of the oxide to 400° C. indicated a total weight loss of 9.0 weight percent. This is due to loss of water of hydration to form cobalt (II, III) oxide.

EXAMPLE II

Nitrogen containing about 52 parts per million of vinyl chloride and about 4.5 parts per million of vinylidene chloride was mixed with oxygen to produce a stream with the approximate composition of air, i.e., about an 80 volume percent/20 volume percent nitrogen/oxygen gas stream. This synthetic air stream had a dew point of less than −25° C. (relative humidity of less than 2 percent). The small amount of vinyl and vinylidene (hereinafter referred to collectively as vinyl chloride) in the nitrogen was disregarded in calculating the 80/20 volume percent nitrogen/oxygen mixture. Humidification of the synthetic air stream was accomplished by passing a portion of the stream through a simple water bubbler. The degree of humidification was controlled by proportioning the relative amount of the gas stream which passed through the bubbler.

The vinyl chloride-containing synthetic air stream was introduced into a preheater, which consisted of a tightly wound coil approximately 2.5 inches in diameter and 2.5 inches in height which was fabricated from 0.25 inch diameter stainless steel tubing. The coil was placed in a 700 watt electric furnace and heated to the temperature desired as the inlet gas stream temperature to the reactor. The preheated synthetic air stream was introduced into the bottom of a vertical catalytic reactor, which was constructed of 0.75 inch diameter 316 stainless steel and which measured approximately 8 inches in length. The catalyst was supported on a 35 mesh stainless steel screen which was located approximately 1.5 inches above the synthetic air stream inlet. A second screen was placed on the top of the catalyst bed to prevent the possible ejection of catalyst particles. Two thermocouples were inserted into the reactor approximately 0.5 inch above and below the catalyst bed to monitor the synthetic air stream temperatures. These thermocouples were positioned such that the junction was located in the center of the reactor. The reactor was insulated with asbestos tape to minimize heat loss and was heated by means of a heating tape. The thermocouple located approximately 0.5 inch above the catalyst bed was utilized as the catalyst bed temperature reference.

The reactor gas effluent was cooled to ambient temperature by means of an approximately 40 inch U-shaped section of 0.25 inch diameter stainless steel tubing. The cooled reactor gas effluent was exhausted to a laboratory hood. At various times during the period in which the synthetic air stream which contained vinyl chloride, was introduced into the reactor, samples were taken of the gas stream inlet to the preheater and of the reactor gas stream effluent exiting the cooler in order to assess the vinyl chloride concentration of the gas stream before and after the catalytic reactor, i.e., the catalyst bed. The vinyl chloride concentration of such gas streams was measured by gas-liquid chromotography utilizing flame ionization detectors. The total gas flow rate to the reactor was measured as was the inlet and outlet temperatures to the reactor.

About 10.3 grams of the cobalt oxide catalyst described in Example I was charged to the reactor as the catalyst bed and tested as a vinyl chloride and vinylidene chloride incineration catalyst. The reactor temperature was maintained at 104° C. The data accumulated is found in Table I.

TABLE I

| Sample No. | Inlet Temp.[a] | Flow Rate[b] | % Rel. Humid.[c] | VCM Concentration[d] Inlet | Outlet | % Diff.[e] | VDCM Concentration[d] Inlet | Outlet | Time of Operation[f] |
|---|---|---|---|---|---|---|---|---|---|
| 1 | 107 | 44 | 1.1 | 46.5 | N.D. | >99 | 2.5 | N.D. | 0.25 |
| 2 | 107 | 44 | 0.8 | 46.5 | N.D. | >99 | 2.5 | N.D. | 2.00 |
| 3 | 107 | 44 | 53 (11) | 46.5 | N.D. | >99 | 2.5 | N.D. | 2.35 |
| 4 | 107 | 44 | 53 (28) | 46.5 | N.D. | >99 | 2.5 | N.D. | 2.65 |
| 5 | 107 | 44 | 53 (43) | 46.5 | Trace | >99 | 2.5 | N.D. | 2.90 |
| 6 | 107 | 44 | 53 (69) | 45.0 | 1.0 | 98 | 2.5 | N.D. | 3.30 |
| 7 | 107 | 44 | 53 (83) | 45.0 | 2.5 | 94 | 2.5 | N.D. | 3.50 |
| 8 | 107[g] | 44 | 1.2 | 45.0 | N.D. | >99 | 2.5 | N.D. | 3.75 |
| 9 | 107 | 44 | 24 (4) | 45.0 | 0.3 | >99 | 2.5 | N.D. | 4.10 |
| 10 | 107 | 44 | 23 (19) | 45.0 | 1.0 | 98 | 2.5 | N.D. | 4.35 |
| 11 | 107[h] | 44 | 0.9 | 45.0 | N.D. | >99 | 2.5 | N.D. | 5.10 |

[a]Gas stream temperature at inlet to catalyst bed in ° C.
[b]Total 80/20 N$_2$/O$_2$ flow rate in liter/hour.
[c]Relative humidity (%) of gas stream at 23° C. Numbers in parentheses refer to the period of time in minutes that the humidified gas stream was used before the sample was obtained.
[d]VCM or VDCM concentration in ppm. N.D. denotes not detected. Trace denotes 0.2 ppm. All values rounded to 0.5 ppm.
[e]% difference in the VCM concentration of the gas stream.
[f]Approximate total time of operation with respect to VCM and VDCM being present in the gas stream in hours.
[g]Sample obtained 9 minutes after discontinuing increased relative humidity atmosphere.
[h]Sample obtained 36 minutes after discontinuing increased relative humidity atmosphere.

The data of Table I shows that the cobalt oxide catalyst prepared in Example I exhibits a high level of catalytic activity as a vinyl chloride and vinylidene chloride incineration catalyst at low relative humidity, i.e., less than 5 percent, e.g., 1.5 percent. More significantly, the catalytic activity of this cobalt oxide catalyst exhibits resistance to inhibition by water vapor, see for example Sample Nos. 3–7. Thus, only an approximately 2 percent breakthrough of the vinyl chloride occurred after 69 minutes of operation with a 53 percent relative humidity atmosphere (see Sample No. 6). Moreover, the activity of the cobalt oxide was regenerated by passage of a low relative humidity atmosphere through the catalyst. Thus, only 9 minutes after decreasing the relative humidity of the gas stream from 53 percent to approximately 1 percent an experimentally significant increase in activity was found (compare Sample No. 7 with Sample No. 8). The data shows further that when the relative humidity was increased again to about 25 percent the short "regeneration" used previously (about 25 minutes) was not sufficient to completely restore the catalytic activity to its initial level.

EXAMPLE III

The cobalt oxide catalyst utilized in Example II was permitted to dry overnight in the reactor at 104° C. by passing continuously a synthetic air gas stream, i.e., a 80/20 nitrogen/oxygen gas mixture, (containing no vinyl or vinylidene chloride) having a relative humidity of about 0.5 percent through the catalyst bed at a total flow rate of 44 liters per hour.

The experimental procedure of Example II was repeated except that the nitrogen tank used to form the synthetic air mixture contained from 10–50 parts per million of vinyl chloride, vinylidene chloride, methyl chloroform, 1,1,2-trichloroethylene and perchloroethylene. The reactor temperature was maintained at 104° C. and the total chlorinated hydrocarbon-containing synthetic air gas stream flow rate through the reactor was 44 liters per hour. The small amount of chlorinated hydrocarbon in the nitrogen was disregarded in calculating the 80/20 volume percent nitrogen/oxygen mixture. Data collected appears in Table II.

EXAMPLE IV

A solution of 141 grams of cobalt (II) sulfate heptahydrate in 450 grams of distilled water was added slowly to a solution of 70 grams of anhydrous sodium hydroxide dissolved in 140 grams of distilled water with vigorous stirring. Thereafter 22 grams of a 35 weight percent aqueous solution of hydrogen peroxide was added slowly in approximately 0.5 ml aliquots over a period of about 25 minutes. After completing the addition of the hydrogen peroxide solution, the reactant mixture was stirred for about 15 minutes. The precipitate was washed with distilled water using a centrifuge and isolated by filtration. The wet filter cake was pressed between felt pads and the pressed filter cake dried at about 50° C. for about 5 hours. The partially dried filter cake was ground with a mortar and pestle and the minus 8, plus 30 mesh particle size fraction of this product dried at about 200° C. for about 5½ hours. A 27 inch mercury vacuum was used during the final hour of the drying period.

The cobalt content of the product was found to be about 81.2 weight percent, as cobalt (II) oxide (CoO), by elemental X-ray spectroscopic analysis. X-ray diffraction analysis indicated that a crystalline phase was present, and this crystalline phase was identified as hydrated cobalt (III) oxide (CoOOH). Thermogravimetric analysis to 400° C. indicated that there was a total weight loss of about 11.8 weight percent.

About 11 grams of this catalyst was tested as a vinyl chloride and vinylidene chloride incineration catalyst at a reactor temperature of 104° C. in essentially the same manner as the cobalt oxide catalyst of Example I was tested, as described in Example II. Testing was performed for a total of 3.75 hours during which period a maximum relative humidity of about 27 percent was used (about 1.85 hours). The results of this testing were similar to the results obtained for the catalyst of Example I.

TABLE II

| Sample No. | % Rel. Humid.[a] | VCM Conc.[b] Inlet | Outlet | VDCM Conc.[b] Inlet | Outlet | MC Conc.[b] Inlet | Outlet | Trichlor. Conc.[b] Inlet | Outlet | Perchlor. Conc.[b] Inlet | Outlet | Time of Operation[c] |
|---|---|---|---|---|---|---|---|---|---|---|---|---|
| 1 | 0.9 | 10.0 | N.D. | 10.5 | N.D. | 28.0 | N.D. | 20.5 | N.D. | 9.0 | 4.5 | 0.20 |
| 2 | 0.6 | 10.0 | N.D. | 10.5 | N.D. | 28.0 | N.D. | 20.5 | 5.5 | 9.0 | 9.5 | 0.85 |
| 3 | 0.6 | 10.0 | N.D. | 10.5 | Trace | 28.0 | N.D. | 20.5 | 11.0 | 9.0 | 9.0 | 1.67 |

[a]Relative humidity (%) of gas stream at 23° C.
[b]All concentrations in ppm. N.D. denotes not detected. Trace denotes 0.2 ppm. All values rounded to 0.5 ppm. VCM = vinyl chloride; VDCM = vinylidene chloride; MC = methylchloroform (1,1,1-trichloroethane) Trichlor = Trichloroethylene; Perchlor = perchloroethylene.
[c]Approximate total time of operation with respect to the chlorinated hydrocarbons being present in the gas stream in hours.

The data of Table II shows that the cobalt oxide catalyst of Example I exhibits a high level of catalytic activity at incineration conditions of low relative humidity and at 104° C. with respect to vinyl chloride, vinylidene chloride and methyl chloroform. While initial high catalytic activity was shown with respect to incineration of trichloroethylene, such activity diminished after about 1⅔ hours operation. The initial partial activity with respect to perchloroethylene incineration decreased rapidly.

EXAMPLE V 5.1 grams of the cobalt oxide catalyst used as the catalyst bed in Examples II and III were mixed with 5.2 grams of the cobalt oxide catalyst used as the catalyst bed in Example IV. The catalyst mixture was dried at about 185° C. for about 1 hour under a 26 inch mercury vacuum. The dried cobalt oxide mixture was then charged to the reactor described in Example II as the catalyst bed and tested as a vinyl chloride and vinylidene chloride incineration catalyst using the procedure described in Example II. Experimental results are tabulated in Table III.

TABLE III

| Sample Number | Temperature[a] Inlet | Outlet | Flow Rate[b] | % Rel. Humid.[c] | VCM Concentration[d] Inlet | Outlet | % Diff.[e] | VDCM Concentration[d] Inlet | Outlet | Time of Operation[f] |
|---|---|---|---|---|---|---|---|---|---|---|
| 1 | 104 | 105 | 44 | 0.8 | 34.5 | N.D. | >99 | 3.0 | N.D. | 0.15 |
| 2 | 72 | 77 | 44 | 0.7 | 34.5 | N.D. | >99 | 3.0 | N.D. | 0.60 |
| 3 | 71 | 77 | 44 | 0.7 | 34.5 | N.D. | >99 | 3.0 | N.D. | 0.70 |

TABLE III-continued

| Sample Number | Temperature[a] Inlet | Outlet | Flow Rate[b] | % Rel. Humid.[c] | VCM Concentration[d] Inlet | Outlet | % Diff.[e] | VDCM Concentration[d] Inlet | Outlet | Time of Operation[f] |
|---|---|---|---|---|---|---|---|---|---|---|
| 4 | 49 | 53 | 44 | 0.7 | 34.5 | N.D. | >99 | 3.0 | N.D. | 0.85 |
| 5 | 48 | 52 | 44 | 0.6 | 34.5 | N.D. | >99 | 3.0 | N.D. | 1.05 |
| 6 | 48 | 52 | 44 | 0.6 | 38.5 | N.D. | >99 | 3.0 | N.D. | 1.30 |
| 7 | 23 | 23 | 44 | 0.6 | 38.5 | N.D. | >99 | 3.0 | N.D. | 1.70 |
| 8 | 23 | 23 | 44 | 0.6 | 38.5 | 3.0 | 90 | 3.0 | N.D. | 2.35 |
| 9 | 23 | 23 | 44 | 0.5 | 43.5 | 15.0 | 65 | 3.0 | 0.5 | 3.45 |
| 10 | 36[g] | 38 | 44 | 0.5 | 43.5 | 23.5 | 45 | 3.0 | 0.5 | 3.75 |
| 11 | 36 | 38 | 44 | 0.5 | 43.5 | 24.5 | 45 | 3.0 | 0.5 | 3.90 |
| 12 | 46[g] | 52 | 44 | 0.5 | 43.5 | 14.5 | 65 | 3.0 | N.D. | 4.20 |
| 13 | 46 | 52 | 44 | 0.5 | 43.5 | 12.5 | 70 | 3.0 | N.D. | 4.35 |
| 14 | 61[h] | 66 | 44 | 0.5 | 43.5 | 6.0 | 85 | 3.0 | N.D. | 4.55 |
| 15 | 62 | 66 | 44 | 0.5 | 43.5 | 5.5 | 85 | 3.0 | N.D. | 4.70 |
| 16 | 73[g] | 78 | 44 | 0.5 | 43.5 | 3.5 | 90 | 3.0 | N.D. | 4.95 |
| 17 | 75 | 78 | 44 | 0.5 | 43.5 | 8.0 | 80 | 3.0 | N.D. | 5.35 |
| 18 | 102[i] | 104 | 44 | 1.7 | 39.0 | N.D. | >99 | 3.5 | N.D. | 0.10 |

[a]Gas stream temperature at inlet to and outlet from catalyst bed in ° C.
[b]See Table I.
[g]Sample obtained 13 minutes after increasing reactor temperature.
[h]Sample obtained 11 minutes after increasing reactor temperature.
[i]Sample obtained after allowing catalyst to heat at 104° C. in the reactor for approximately 4 and ⅛ days.

The data of Table III indicate that the catalyst mixture exhibited a relatively high level of catalytic activity at low relative humidity in the temperature range of from about 23° C. to about 104° C. Although the catalytic activity at 23° C. was found to decrease by approximately 50 percent over about 2 hours, the level of activity was still significant after this period of time.

The activity of the catalyst toward vinylidene chloride incineration was found to be similar to that exhibited toward vinyl chloride.

EXAMPLE VI

A solution of 100 grams of cobalt (II) sulfate heptahydrate dissolved in 320 grams of distilled water was added slowly with vigorous stirring to a solution of 50 grams of anhydrous sodium hydroxide dissolved in 100 grams of distilled water. After addition of the cobalt sulfate solution, the reactant mass was stirred for approximately 10 minutes. The precipitated product was thoroughly washed with distilled water by decantation utilizing a centrifuge. The precipitate was washed a total of four times. After washing, the precipitated product was isolated by filtration. The wet filter cake was then dried at approximately 50° C. for about 20 hours. After drying, the filter cake was granulated using a mortar and pestle into a minus 8 mesh particle size product. The minus 8, plus 30 mesh particle size fraction of this product was then dried at approximately 200° C. for about 5.5 hours. A 27 inch mercury vacuum was used during the final hour of the drying period. The cobalt content of the oxide was found to be about 94.8 weight percent as cobalt (II, III) oxide by elemental X-ray spectroscopic analysis. X-ray diffraction analysis indicated that a crystalline phase was present, and that this phase was cobalt (II, III) oxide ($Co_3O_4$). Thermogravimetric analysis to 400° C. indicated a total weight loss of about 3.1 percent.

Utilizing the apparatus and experimental procedure of Example II, about 12.5 grams of this cobalt oxide catalyst was charged to the reactor as the catalyst bed and tested as a vinyl chloride-vinylidene chloride incineration catalyst. Results are tabulated in Table IV.

TABLE IV

| Sample Number | Inlet Temperature[a] | Flow Rate[b] | % Rel. Humid.[c] | VCM Concentration[d] Inlet | Outlet | % Diff.[e] | VDCM Concentration[d] Inlet | Outlet | Time of Operation[f] |
|---|---|---|---|---|---|---|---|---|---|
| 1 | 109 | 44 | 1.9 | 37.0 | N.D. | >99 | 2.5 | N.D. | 0.10 |
| 2 | 109 | 44 | 1.6 | 37.0 | N.D. | >99 | 2.5 | N.D. | 0.25 |
| 3 | 109 | 44 | 59 (7) | 37.0 | N.D. | >99 | 2.5 | N.D. | 0.50 |
| 4 | 109 | 44 | 59 (27) | 37.0 | N.D. | >99 | 2.5 | N.D. | 0.75 |
| 5 | 109 | 44 | 59 (38) | 37.0 | N.D. | >99 | 2.5 | N.D. | 1.00 |
| 6 | 109 | 44 | 59 (52) | 37.0 | N.D. | >99 | 2.5 | N.D. | 1.20 |
| 7 | 109 | 44 | 59 (77) | 37.0 | 0.2 | >99 | 2.5 | N.D. | 1.65 |
| 8 | 109 | 44 | 59 (88) | 37.0 | 0.3 | >99 | 2.5 | N.D. | 1.75 |
| 9 | 110[g] | 44 | 1.6 | 37.0 | N.D. | >99 | 2.5 | N.D. | 0.15 |

[a]See Table I
[g]Remaining sample obtained after passing $N_2/O_2$ stream only through catalyst bed at 110° C. for 1.1 hours at approximately 0.9% relative humidity.

The data of Table IV show that the cobalt oxide catalyst tested exhibited a high level of catalytic activity with respect to incineration of vinyl chloride and vinylidene chloride at the 104° C. reactor temperature and under conditions of high and low relative humidity. This oxide sample exhibited excellent resistance to inhibition of catalytic activity by water vapor. Thus, even after about 1½ hours operation at approximately 60 percent relative humidity, less than 0.5 parts per million of vinyl chloride was found in the effluent gas from the reactor and no vinylidene chloride concentration was detectable. As in the case of the cobalt oxide catalyst of Example I, the loss in activity after prolonged contact with a higher humidity atmosphere was restored by passage of low relative humidity air through the heated catalyst bed.

EXAMPLE VII

Approximately 20 cc of a commercial cobalt oxide on alumina catalyst was dried in a vacuum oven at a temperature of approximately 200° C. and a vacuum of about 27 inches of mercury for a period of about 2½ hours. The cobalt content of this catalyst was about 18 weight percent as cobalt (II) oxide (CoO) and had a B.E.T. surface area of 49 square meters per gram. 19.3 grams of the dried catalyst was charged to the reactor described in Example II and tested as an incineration catalyst for vinyl chloride. The catalyst was charged to the reactor with the reactor temperature at 104° C. and with an 80/20 nitrogen/oxygen gas stream passing through the reactor. This gas stream was preheated to temperatures in the range of 23° to 104° C. Results are tabulated in Table V.

TABLE V

| Sample Number | Temperature[a] Inlet | Temperature[a] Outlet | Flow Rate[b] | % Rel. Humid.[c] | VCM Concentration[d] Inlet | VCM Concentration[d] Outlet | % Diff.[e] | VDCM Concentration[d] Inlet | VDCM Concentration[d] Outlet | Time of Operation[f] |
|---|---|---|---|---|---|---|---|---|---|---|
| 1 | 105 | 104 | 44 | 0.8 | 34.0 | N.D. | >99 | 2.5 | N.D. | 0.10 |
| 2 | 105 | 104 | 44 | 0.6 | 34.0 | N.D. | >99 | 2.5 | N.D. | 0.40 |
| 3 | 23[g] | 23 | 44 | 1.0 | 37.5 | 28.0 | 25 | 3.0 | 1.5 | 0.10 |
| 4 | 23 | 23 | 44 | 0.8 | 37.5 | 29.0 | 25 | 3.0 | 1.5 | 0.25 |
| 5 | 47[h] | 49 | 44 | 0.7 | 37.5 | 9.5 | 80 | 3.0 | N.D. | 0.50 |
| 6 | 47 | 49 | 44 | 0.7 | 37.5 | 3.5 | 90 | 3.0 | N.D. | 0.55 |
| 7 | 47 | 49 | 44 | 0.7 | 37.5 | 3.0 | 90 | 3.0 | N.D. | 0.75 |
| 8 | 47 | 49 | 44 | 0.7 | 37.5 | 2.5 | 90 | 3.0 | N.D. | 0.90 |
| 9 | 72[i] | 73 | 44 | 0.7 | 38.0 | 0.5 | 99 | 3.0 | N.D. | 1.15 |
| 10 | 74 | 73 | 44 | 0.6 | 38.0 | 0.5 | 99 | 3.0 | N.D. | 1.35 |
| 11 | 102[j] | 102 | 44 | 0.6 | 38.0 | N.D. | >99 | 3.0 | N.D. | 1.50 |
| 12 | 106 | 104 | 44 | 0.6 | 38.0 | N.D. | >99 | 3.0 | N.D. | 1.65 |

[a]Gas stream temperature at inlet to and outlet from catalyst bed in ° C.
[b]See Table I.
[f]Remaining samples obtained after passing N₂/O₂ stream only through catalyst bed overnight at 9 liters/hour at approximately 1.1% relative humidity. Reactor allowed to cool to ambient temperature.
[h]Sample obtained 14 minutes after initiating warmup of reactor to 49° C.
[i]Sample obtained 8 minutes after initiating warmup of reactor to 73° C.
[j]Sample obtained 5 minutes after initiating warmup of reactor to 104° C.

about 108° C. during the loading.

The catalyst showed no activity with respect to incineration of vinyl chloride or vinylidene chloride at a gas flow rate of 44 liters/hour, inlet temperature of about 108° C. and a relative humidity of about 1.5 percent. X-ray spectroscopic analysis of this commercial catalyst indicated that the cobalt was present as a highly crystalline form of cobalt (II, III) oxide and differed from the cobalt oxide samples prepared in accordance with Examples I, IV and VI.

EXAMPLE VIII

Using the experimental procedure of Example VI, cobalt oxide was prepared using 93 grams of cobalt (II) sulfate heptahydrate dissolved in 300 grams of distilled water, and 47 grams of anhydrous sodium hydroxide dissolved in 94 grams of distilled water. The final drying of the product was performed at approximately 200° C. for a period of about 7 hours. A 27 inch mercury vacuum was used during the final two hours of the drying period. The cobalt content of the oxide was found to be about 93.7 weight percent as cobalt (II, III) oxide by elemental X-ray spectroscopic analysis. X-ray diffraction analysis indicated that a crystalline phase was present, and this phase was identified as cobalt (II, III) oxide ($Co_3O_4$). Thermogravimetric analysis indicated a total weight loss of about 3.6 weight percent at a temperature of 400° C.

Utilizing the apparatus and procedure of Example II, about 7 grams of this cobalt oxide catalyst was charged to the reactor as the catalyst bed and tested as a vinyl chloride-vinylidene chloride incineration catalyst at temperatures in the range of 23° to 104° C. Results are tabulated in Table V.

The data of Table V show that the cobalt oxide catalyst tested exhibited an experimentally significant level of catalytic activity with respect to incineration of vinyl chloride and vinylidene chloride at temperatures from about 23° to 104° C. and at conditions of low relative humidity.

EXAMPLE IX

The cobalt oxide utilized as the catalyst bed in Example VIII was heated in the reactor at about 104° C. for approximately 1¾ days. The cobalt oxide was then tested as an incineration catalyst for a mixture of $C_2$-chlorinated hydrocarbons using the same procedure described in Example III. The total $C_2$-chlorinated hydrocarbon-containing synthetic air gas stream flow through the reactor was 44 liters per hour. The data obtained in tabulated in Table VI.

TABLE VI

| Sample No. | % Rel. Humid.[a] | VCM Concentration[b] Inlet | VCM Concentration[b] Outlet | VDCM Concentration[b] Inlet | VDCM Concentration[b] Outlet | MC Concentration[b] Inlet | MC Concentration[b] Outlet | Trichlor. Conc.[b] Inlet | Trichlor. Conc.[b] Outlet | Perchlor. Conc.[b] Inlet | Perchlor. Conc.[b] Outlet | Time of Operation[c] |
|---|---|---|---|---|---|---|---|---|---|---|---|---|
| 1 | 0.7[d] | 8.0 | N.D. | 8.0 | N.D. | 25.5 | 0.5 | 17.0 | N.D. | 10.0 | 3.5 | 0.20 |
| 2 | 0.5[e] | 8.0 | N.D. | 8.0 | N.D. | 25.5 | N.D. | 17.0 | N.D. | 10.0 | 1.0 | 0.70 |
| 3 | 0.4[e] | 8.0 | N.D. | 8.0 | N.D. | 25.5 | N.D. | 17.0 | 0.5 | 10.0 | 3.0 | 1.65 |
| 4 | 0.4[e] | 8.0 | N.D. | 8.0 | N.D. | 25.5 | N.D. | 17.0 | 1.5 | 10.0 | 4.5 | 2.20 |
| 5 | 0.4[e] | 8.0 | N.D. | 8.0 | N.D. | 25.5 | N.D. | 17.0 | 3.0 | 10.0 | 5.5 | 2.90 |
| 6 | 0.4[f] | 8.0 | N.D. | 8.0 | N.D. | 25.5 | N.D. | 17.0 | N.D. | 10.0 | 0.5 | 4.30 |
| 7 | 0.4[f] | 8.0 | N.D. | 7.0 | N.D. | 16.5 | N.D. | 17.5 | N.D. | 8.5 | 4.0 | 5.35 |
| 8 | 0.4[f] | 8.0 | N.D. | 7.0 | N.D. | 16.5 | N.D. | 17.5 | 0.5 | 8.5 | 8.0 | 6.35 |

[a-c]See Table II.
[d]Inlet temperature of 110° C., and reactor temperature of 104° C.
[e]Inlet temperature of 148° C.–149° C., and reactor temperature of 149° C–150° C.
[f]Inlet temperature of 190° C.–191° C., and reactor temperature of 199° C.–200° C.

The data of Table VI show that the cobalt oxide catalyst of Example VIII exhibits a high level of catalytic activity at conditions of low relative humidity in the temperature range of 104°–190° C. with respect to vinyl chloride, vinylidene chloride, methyl chloroform, and trichloroethylene. While relatively high catalytic activity was initially shown with respect to perchloroethylene at both 150° and 190° C., the activity diminished relatively rapidly at both temperatures.

EXAMPLE X 7.5 grams of the cobalt oxide prepared in Example VIII was heated for a period of about 2 hours in a muffle furnace at a temperature of about 500° C. After heating, the cobalt content of the heat-treated oxide was determined and found to be about 96.2 weight percent as cobalt (II,III) oxide by elemental X-ray spectroscopic analysis. X-ray diffraction analysis indicated that a highly crystalline phase was present, and this phase was identified as cobalt (II,III) oxide. Thermogravimetric analysis indicated a total weight loss of 0.5 weight percent at a temperature of 400° C.

Utilizing the apparatus and procedure of Example II, about 6.7 grams of this heat-treated oxide catalyst was charged to the reactor as the catalyst bed and tested as a vinyl chloride-vinylidene chloride incineration catalyst. Results obtained are tabulated in Table VII.

Utilizing the apparatus and procedure of Example II, about 14.5 grams of this oxide was charged to the reactor as the catalyst bed and tested as a vinyl chloride-vinylidene chloride incineration catalyst at a reactor temperature of 104° C. Results are tabulated in Table VIII.

TABLE VIII

| Sample Number | Inlet Temperature$^a$ | Flow Rate$^b$ | % Rel. Humid.$^c$ | VCM Concentration$^d$ Inlet | Outlet | % Diff.$^e$ | VDCM Concentration$^d$ Inlet | Outlet | Time of Operation$^f$ |
|---|---|---|---|---|---|---|---|---|---|
| 1 | 102 | 44 | 0.7 | 35.0 | 26.0 | 25 | 2.5 | 1.5 | 0.15 |
| 2 | 102 | 9 | 1.2 | 35.0 | 21.0 | 40 | 2.5 | 0.5 | 0.50 |
| 3 | 102 | 44 | 51 (7) | 35.0 | 32.5 | 5 | 2.5 | 2.0 | 0.70 |
| 4 | 102 | 9 | 28 (14) | 35.0 | 31.5 | 5 | 2.5 | 1.5 | 0.80 |
| 5 | 102$^g$ | 9 | 1.4 | 35.0 | 24.0 | 30 | 2.5 | 0.5 | 1.05 |

$^{a-f}$See Table I.
$^g$Last sample obtained after passing N$_2$(VCM)/O$_2$ stream through catalyst bed for 11 minutes at approximately 1.4% relative humidity and a 44 liter/hour total flow rate.

Comparison of the data of Table VIII with the data of the previous Examples shows that this commercial cobalt oxide sample exhibited a lower, but experimentally significant level of catalytic activity with respect to the incineration of vinyl chloride and vinylidene chloride. The data also shows that this cobalt oxide catalyst ex-

TABLE VII

| Sample Number | Inlet Temperature$^a$ | Flow Rate$^b$ | % Rel. Humid.$^c$ | VCM Concentration$^d$ Inlet | Outlet | % Diff.$^e$ | VDCM Concentration$^d$ Inlet | Outlet | Time of Operation$^f$ |
|---|---|---|---|---|---|---|---|---|---|
| 1 | 109 | 44 | 0.6 | 41.5 | N.D. | >99 | 2.5 | N.D. | 0.15 |
| 2 | 109 | 44 | 50 (10) | 41.5 | 25.5 | 40 | 2.5 | 0.5 | 1.00 |
| 3 | 110 | 44 | 53 (17) | 41.5 | 30.0 | 30 | 2.5 | 0.5 | 1.10 |
| 4 | 109$^g$ | 44 | 0.8 | 41.5 | 15.5 | 60 | 2.5 | 0.5 | 1.35 |
| 5 | 109 | 44 | 0.8 | 41.5 | 21.0 | 50 | 2.5 | 1.0 | 1.50 |
| 6 | 110$^h$ | 44 | 0.8 | 36.5 | 5.5 | 85 | 3.0 | N.D. | 0.15 |

$^{a-f}$See Table I.
$^g$Remaining samples obtained after discontinuing increased relative humidity atmosphere.
$^h$Last sample obtained after passing N$_2$/O$_2$ stream only through catalyst bed overnight at 104° C. and approximately 0.3 % relative humidity at a total flow rate of approximately 44 liters/hour.

The data of Table VII show that the heat-treated cobalt oxide sample exhibited significantly greater sensitivity to inhibition of catalytic activity at increased relative humidity levels than did similarly prepared, non-highly heated oxide samples, e.g. see Example VI. Comparison of the elemental analysis and thermogravimetric analysis results of this highly heated cobalt oxide with the analytical results obtained with the cobalt oxide of Example VIII indicates that the heating of the cobalt oxide at about 500° C. significantly reduced the amount of water of hydration present in the catalyst.

EXAMPLE XI

A commercial sample of cobalt oxide was formed into pellets of about 0.25 inch diameter and 0.25 inch length using a manual press. The pellets were dried at about 200° C. for about twenty hours. During the final approximately 3.5 hours of the drying period, a 26 inch mercury vacuum was used. Elemental analysis by X-ray spectroscopy indicated that the cobalt content of the resultant oxide was about 92.9 weight percent as Co$_3$O$_4$. X-ray diffraction analysis indicated that a crystalline phase was present, and that this phase was cobalt (II,III) oxide, Co$_3$O$_4$. Thermogravimetric analysis indicated a total weight loss of about 0.3 weight percent at a temperature of 400° C.

hibited a high level of sensitivity to inhibition of activity by water vapor relative to that of the cobalt oxides of Examples I-VI. Both the cobalt oxide of this Example and Example X contained relatively low amounts of water of hydration, as indicated by the thermogravimetric analysis results.

EXAMPLE XII

A commercial sample of cobalt oxide to which about 2.5 weight percent of distilled water was added, as a binder, was formed into pellets using the procedure of Example XI. The pellets were dried at about 200° C. for about 8 hours. During the final approximately three hours of drying, a 26 inch mercury vacuum was used. Elemental analysis by X-ray spectroscopy indicated that the cobalt content of the resultant oxide was about 95.5 weight percent as cobalt (II) oxide. X-ray diffraction analysis indicated that the oxide was predominantly crystalline cobalt (II) oxide. Thermogravimetric analysis indicated a total weight loss of less than about 0.2 weight percent at a temperature of 350° C.

Utilizing the apparatus and procedure of Example II, about 15 grams of this oxide was charged to the reactor as the catalyst bed and tested as a vinyl chloride-vinylidene chloride incineration catalyst. Results are tabulated in Table IX.

TABLE IX

| Sample Number | Temperature$^a$ Inlet | Outlet | Flow Rate$^b$ | % Rel. Humid.$^c$ | VCM Concentration$^d$ Inlet | Outlet | % Diff.$^e$ | VDCM Concentration$^d$ Inlet | Outlet | Time of Operation$^f$ |
|---|---|---|---|---|---|---|---|---|---|---|
| 1 | 112 | 104 | 44 | 0.7 | 36.5 | 30.0 | 15 | 3.0 | 2.5 | 0.15 |
| 2 | 112 | 104 | 9 | 1.8 | 36.5 | 22.0 | 40 | 3.0 | 2.0 | 0.35 |
| 3 | 133 | 131 | 9 | 1.4 | 36.5 | 16.0 | 55 | 3.0 | 2.0 | 1.00 |
| 4 | 133 | 132 | 9 | 1.3 | 36.5 | 20.5 | 45 | 3.0 | 2.5 | 1.50 |

TABLE IX-continued

| Sample Number | Temperature[a] Inlet | Outlet | Flow Rate[b] | % Rel. Humid.[c] | VCM Concentration[d] Inlet | Outlet | % Diff.[e] | VDCM Concentration[d] Inlet | Outlet | Time of Operation[f] |
| --- | --- | --- | --- | --- | --- | --- | --- | --- | --- | --- |
| 5 | 131 | 130 | 9 | 1.3 | 36.5 | 21.5 | 40 | 3.0 | 2.5 | 2.15 |

[a] Gas stream temperature at inlet to and outlet from catalyst bed in °C.
[b] See Table I.

The data of Table IX show that this commercial cobalt oxide sample exhibited a low, but experimentally significant level of catalytic activity with respect to the incineration of vinyl chloride and vinylidene chloride.

EXAMPLE XIII

A commercial sample of cobalt oxide, to which about 5 weight percent of distilled water was added, as a binder, was formed into pellets as in Example XI. The pellets were dried at about 200° C. for about 7 hours. During the final approximately three hours of drying, a 26 inch mercury vacuum was used. Elemental analysis by X-ray spectroscopy indicated that the cobalt content of the resultant oxide was about 95.3 weight percent as cobalt (II, III) oxide ($Co_3O_4$). X-ray diffraction anaylsis indicated that the oxide was predominantly crystalline cobalt (II, III) oxide. Thermogravimetric analysis indicated a total weight loss of about 0.1 weight percent at a temperature of 400° C.

Utilizing the apparatus and procedure of Example II, about 17.6 grams of this oxide was charged to the reactor as the catalyst bed and tested at a reactor temperature of 104° C. Results are tabulated in Table X.

TABLE X

| Sample No. | Inlet[a] Temp. | Flow Rate[b] | % Rel. Humid.[c] | VCM Concentration[d] Inlet | Outlet | % Diff.[e] | VDCM Concentration[d] Inlet | Outlet | Time of Operation[f] |
| --- | --- | --- | --- | --- | --- | --- | --- | --- | --- |
| 1 | 117 | 9 | 1.2 | 36.5 | 2.5 | 95 | 3.0 | N.D. | 0.15 |
| 2 | 117 | 9 | 1.2 | 36.5 | 6.0 | 85 | 3.0 | 0.5 | 0.30 |
| 3 | 117 | 9 | 1.2 | 36.5 | 9.5 | 75 | 3.0 | 0.5 | 0.85 |

[a] See Table I

The data of Table X show that this commercial cobalt oxide sample exhibited a significant level of activity with respect to the incineration of vinyl chloride and vinylidene chloride. The data also indicates that this low water of hydration sample apparently shows a relatively rapid decrease in activity with time.

EXAMPLE XIV

A cobalt oxide was prepared using the experimental procedure of Example I. The amount of each reactant used was 141 grams of cobalt (II) sulfate heptahydrate dissolved in 450 grams of distilled water, 70 grams of anhydrous sodium hydroxide dissolved in 140 grams of distilled water, and 22 grams of 35 weight percent aqueous solution of hydrogen peroxide. After drying at about 50° C. for a period of about 5 hours, the filter cake was granulated with a mortar and pestle. The minus 30 mesh particle size fraction of this cobalt oxide sample was formed into pellets as in Example XI, and then dried at about 200° C. for a period of about 3 hours under a 27 inch mercury vacuum.

Utilizing the apparatus and procedure of Example II, about 3.6 grams of this oxide was charged to the reactor as the catalyst bed and tested at a reactor temperature of 104° C. The synthesized air mixture used in the evaluation contained 37.5 ppm of vinyl chloride and 3 ppm of vinylidene chloride, and the inlet temperature to the reactor was 108° C. At a total flow rate of about 9 liter/hour, and a relative humidity of about 2.5 percent, only about 0.5 ppm of vinyl chloride and no detectable quantity of vinylidene chloride was found in the exhaust from the reactor. At a total flow rate of about 44 liter/hour and a relative humidity of about 1.2 percent, about 9.5ppm of vinyl chloride and 0.5 ppm of vinylidene chloride was found in the effluent gas from the reactor. These results, which were obtained using a relatively small quantity of oxide, demonstrate that the lower activity of the commercial oxide samples of Examples XI-XIII was not due to the pelletized shape of the catalyst.

EXAMPLE XV

Using the experimental procedure of Example VI, a cobalt oxide sample was prepared. The reactants used were 93 grams of cobalt (II) sulfate heptahydrate dissolved in 300 grams of distilled water and 47 grams of anhydrous sodium hydroxide dissolved in 94 grams of distilled water. After washing, about one-fourth of the wet centrifuge cake was slurried with about twice its volume of commercial fumed silica in distilled water. After isolation by filtration, the wet filter cake was dried at about 50° C. for about 2¾ days. After drying, the filter cake was granulated using a mortar and pestle into a minus 8 mesh particle size product. The minus 8, plus 30 mesh particle size fraction of this product was then dried at about 200° C. for a period of about 7 hours. A 26 inch mercury vacuum was used during the final 4.5 hours of drying. The cobalt content of the resultant oxide was found to be about 57.9 weight percent as cobalt (II, III) oxide ($Co_3O_4$) by elemental X-ray spectroscopic analysis. X-ray diffraction analysis indicated that a crystalline phase was present, and this phase was identified as cobalt (II, III) oxide. Thermogravimetric analysis indicated a total weight loss of 3.8 weight percent at a temperature of 400° C.

Utilizing the apparatus and procedure of Example II, about 7.8 grams of this oxide was charged to the reactor as the catalyst bed and tested at a reactor temperature of 104° C. Results obtained are tabulated in Table XI.

TABLE XI

| Sample No. | Inlet Temp.[a] | Flow Rate[b] | % Rel. Humid.[c] | VCM Concentration[d] Inlet | Outlet | % Diff.[e] | VDCM Concentration[d] Inlet | Outlet | Time of Operation[f] |
| --- | --- | --- | --- | --- | --- | --- | --- | --- | --- |
| 1 | 107 | 44 | 1.4 | 39.0 | N.D. | >99 | 3.5 | N.D. | 0.10 |
| 2 | 105 | 44 | 50 (4) | 39.0 | N.D. | >99 | 3.5 | N.D. | 0.20 |
| 3 | 107 | 44 | 56 (64) | 39.0 | 6.0 | 85 | 3.5 | N.D. | 1.25 |
| 4 | 108 | 44 | 56 (75) | 39.0 | 8.0 | 80 | 3.5 | N.D. | 1.40 |
| 5 | 108 | 44 | 56 (91) | 39.0 | 12.0 | 70 | 3.5 | N.D. | 1.70 |

TABLE XI-continued

| Sample No. | Inlet Temp.[a] | Flow Rate[b] | % Rel. Humid.[c] | VCM Concentration[d] Inlet | VCM Concentration[d] Outlet | % Diff.[e] | VDCM Concentration[d] Inlet | VDCM Concentration[d] Outlet | Time of Operation[f] |
|---|---|---|---|---|---|---|---|---|---|
| 6 | 108 | 44 | 57 (110) | 39.0 | 17.0 | 55 | 3.5 | N.D. | 2.00 |
| 7 | 108 | 44 | 57 (130) | 39.0 | 19.0 | 50 | 3.5 | 0.5 | 2.35 |
| 8 | 108[g] | 44 | 1.2 | 39.0 | N.D. | >99 | 4.0 | N.D. | 2.80 |
| 9 | 108 | 44 | 1.1 | 39.0 | 0.5 | 99 | 4.0 | N.D. | 3.20 |
| 10 | 108 | 44 | 1.1 | 39.0 | 1.5 | 95 | 4.0 | N.D. | 3.35 |
| 11 | 108 | 44 | 1.0 | 39.0 | 2.0 | 95 | 4.0 | N.D. | 3.50 |
| 12 | 108 | 44 | 1.0 | 39.0 | 3.0 | 90 | 4.0 | N.D. | 3.70 |
| 13 | 108 | 44 | 1.0 | 39.0 | 4.5 | 90 | 4.0 | N.D. | 4.00 |

[a–f]See Table I
[g]Remaining Samples obtained after passing $N_2(VCM)/O_2$ stream through catalyst bed at 104° C. for 23 minutes at approximately 1.4% relative humidity The data of Table XI show that the cobalt oxide-fumed silica samples exhibited a high level of catalytic activity with respect to the removal of both vinyl chloride and vinylidene chloride at conditions of high and low relative humidity. As in the case of several of the previous cobalt oxide samples (see Examples II and VI), the small loss in activity after prolonged contact with the higher humidity atmosphere was restored by passage of low relative humidity air through the heated catalyst bed.

EXAMPLE XVI

After washing with distilled water and drying overnight at about 70° C. under a 26 inch mercury vacuum, 20 grams of a commercial 8–14 mesh activated alumina was impregnated under vacuum with a solution of 20 grams of cobalt (II) sulfate heptahydrate dissolved in 20 grams of distilled water. After decanting off the excess cobalt (II) sulfate solution, the alumina particles were dried at about 70° C. under a 26 inch mercury vacuum for about 2 hours. The dried alumina particles were then reacted with a solution of 5 grams of anhydrous sodium hydroxide dissolved in 20 grams of distilled water for a period of about 1 hour at about 70° C. After decanting off the excess caustic solution, the alumina particles were then washed with distilled water. The alumina particles were dried at about 70° C. for about 2 hours, and then at about 200° C. for about 18 hours. During the final 2.5 hours of the latter drying period, a 26 inch mercury vacuum was used. The cobalt content was determined to be 7.9 weight percent as cobalt (II, III) oxide ($Co_3O_4$), by elemental X-ray spectroscopic analysis.

Utilizing the apparatus and procedure of Example II, about 17 grams of this cobalt oxide on an activated alumina sample was charged to the reactor as the catalyst bed and tested at a reactor temperature of 140° C. Results are tabulated in Table XII.

EXAMPLE XVII

About twenty grams of commercially available cobalt (II) hydroxide was slurried with 150 grams of distilled water. The slurry was filtered and the filter cake dried at about 70° C. for about 2 days. The dried filter cake was pulverized with a mortar and pestle. The minus 8, plus 30 mesh particle size fraction was then dried at about 200° C. for 5¼ hours. During the last three hours of this drying period, a 26.5 inch mercury vacuum was applied to the sample. The cobalt content of the dried product was determined to be 93.6 weight percent cobalt (II, III) oxide, as $Co_3O_4$. X-ray diffraction analysis indicated that a crystalline phase was present, which was identified as cobalt (II, III) oxide. The surface area of the cobalt oxide product was found to be 115 m²/gram.

About 10 grams of this cobalt oxide was charged to the reactor described in Example II as the catalyst bed and tested as a vinyl chloride incineration catalyst. The catalyst bed occupied a volume of about 13 cubic centimeters. The procedure of Example II was followed except that vinyl chloride was supplied to the system by means of a standard gas cylinder of nitrogen containing an analytically measured 2.5 weight percent of vinyl chloride. The amount of vinyl chloride introduced into the reactor was controlled by the amount of vinyl chloride-containing nitrogen allowed to bleed into the system. The synthetic air stream was introduced into the reactor at a rate of 44 liters per minute. The conditions under which the test was performed and the results thereof are tabulated in Table XIII.

TABLE XIII

| Inlet Temp.[a] | Reactor Temp.[b] | % Rel. Humid.[c] | VCM Concentration[d] Inlet | VCM Concentration[d] Outlet | % Diff.[e] | Time of Operation[f] |
|---|---|---|---|---|---|---|
| 108 | 104 | 0.2 | 800 | 1.0 | >99 | 0.20 |
| 106 | 104 | 0.2 | 780 | 75 | 90 | 0.45 |
| 104 | 104 | 0.2 | 770 | 240 | 70 | 0.65 |
| 103[g] | 104 | 0.2 | 430 | 150 | 65 | 0.90 |
| 103 | 104 | 0.2 | 450 | 170 | 60 | 1.10 |
| 103 | 104 | 0.2 | 450 | 180 | 60 | 1.20 |
| 133[h] | 146 | 0.2 | 450 | N.D. | >99 | 1.30 |
| 164[i] | 188 | 0.2 | 440 | N.D. | >99 | 1.50 |

TABLE XII

| Sample No. | Inlet Temp.[a] | Flow Rate[b] | % Rel. Humid.[c] | VCM Concentration[d] Inlet | VCM Concentration[d] Outlet | % Diff.[e] | VDCM Concentration[d] Inlet | VDCM Concentration[d] Outlet | Time of Operation[f] |
|---|---|---|---|---|---|---|---|---|---|
| 1 | 105 | 44 | 0.9 | 35.5 | 23.5 | 35 | 2.5 | 0.5 | 0.10 |
| 2 | 104 | 44 | 0.7 | 35.5 | 24.0 | 35 | 2.5 | 1.0 | 0.50 |
| 3 | 103 | 9 | 1.4 | 32.5 | 6.0 | 80 | 2.5 | N.D. | 0.75 |
| 4 | 103 | 9 | 1.4 | 32.5 | 9.0 | 70 | 2.5 | 0.5 | 1.90 |
| 5 | 105[g] | 9 | 47 (30) | 35.0 | 33.0 | — | 2.5 | 2.0 | 2.45 |
| 6 | 105[h] | 9 | 1.7 | 35.0 | 20.5 | 40 | 2.5 | 1.5 | 2.65 |

[a–f]See Table I
[g]Sample obtained after passing humidified gas stream through catalyst bed at approximately 50% relative humidity for 27 minutes at a total flow rate of 44 liter/hour and 3 minutes at 9 liter/hour.
[h]Sample obtained after passing $N_2(VCM)/O_2$ stream through catalyst bed at a total flow rate of 44 liter/hour for 8 minutes.

The data of Table XII indicate that this cobalt oxide on an activated alumina sample showed a significant level of activity with respect to the incineration of the vinyl chloride and vinylidene chloride at low relative humidity.

TABLE XIII-continued

| Inlet Temp.[a] | Reactor Temp.[b] | % Rel. Humid.[c] | VCM Concentration[d] Inlet | VCM Concentration[d] Outlet | % Diff.[e] | Time of Operation[f] |
|---|---|---|---|---|---|---|
| 164[j] | 188 | 0.2 | 820 | N.D. | >99 | 1.60 |

[a]Gas stream temperature to inlet to catalyst bed in ° C.
[b]Reactor temperature in ° C.
[c]Relative Humidity (%) of synthetic air gas stream at 23° C.
[d]VCM concentration in ppm.; N.D. denotes Not Detected; Values of <100 ppm rounded to 5 ppm; Values >100 ppm rounded to 10 ppm.
[e]Approximate % difference in the inlet and outlet VCM concentrations.
[f]Approximate total time of operation in hours.
[g]Sample obtained 10 minutes after reducing VCM concentration.
[h]Sample obtained 6 minutes after increase in reactor temperature.
[i]Sample obtained 10 minutes after increase in reactor temperature.
[j]Sample obtained 5 minutes after increasing VCM concentration.

The data of Table XIII show that at a reactor temperature of 104° C., the catalyst activity appears to drop rapidly and then stabilizes. When the reactor temperature is raised, there is a significant increase in catalyst activity.

Further testing with the catalyst of Example XVII showed that when the apparent capacity of the catalyst to incinerate vinyl chloride was exceeded, other $C_2$-chlorinated hydrocarbons were observed in the product gas leaving the reactor. For example, when a synthetic air stream of 20 percent relative humidity and containing 2960 ppm vinyl chloride was passed through the catalyst bed at a rate of 9 liters per hour (apparent residence time of about 5 seconds) and a temperature of 188° C., the reactor outlet was determined to have 680 ppm vinyl chloride, 23 ppm vinylidene chloride, 190 ppm 1,2-dichloroethylene, about 11 ppm of trichloroethylene and 280 ppm of trichloroethane. This result indicates that under conditions of excessive residence time and excess vinyl chloride (beyond the capacity of the catalyst), side reactions occur. When the relative humidity of the gas stream was lowered to about 0.9 percent, there was a significant lowering in the concentration of by-products formed. Thus, the relative concentration of by-products depends on the operating conditions, e.g., the vinyl chloride concentration in the feed to the reactor, relative humidity of the feed gases, temperature of the reactor, residence time, activity of the catalyst, etc.

After extensive testing at the 188° C. reactor temperature in the presence of vinyl chloride concentrations as high as 3300 ppm, the surface area of the cobalt oxide catalyst was found to be 42 m²/gram. The reduction in surface area is consistent with the initial decrease of activity observed in Table XIII.

The above examples demonstrate that hydrated cobalt oxides exhibit high catalytic activity at temperatures of from about 20° C., e.g., 23° C., to about 190° C., e.g., 188° C., under conditions of low and high relative humidity respecting incineration of $C_2$-halogenated, e.g., chlorinated, hydrocarbons such as vinyl chloride, vinylidene chloride, methyl chloroform and trichloroethylene, especially vinyl and vinylidene chloride. The above examples show also that cobalt oxide catalysts that do not have a significant level of water of hydration, e.g., greater than 1, preferably greater than 2 or 3 weight percent (as determined by thermogravimetric analysis to 400° C.), are useful under conditions of low relative humidity. The hydrated cobalt oxide catalysts are preferred. Further, the examples demonstrate that the $C_2$-halogenated hydrocarbon content of the gas stream containing same can be reduced from the concentrations present in the gas stream to lower levels, preferably to less than 10 ppm, e.g., less than 0.5 ppm (when the initial concentrations are higher than the preferred reduced level).

The above described catalysts will find particular application in reducing $C_2$-chlorinated hydrocarbons, e.g., vinyl chloride and vinylidene chloride, in air streams containing same. Thus, it is contemplated that vent discharges from enclosed work areas in polyvinyl chloride producing facilities, vinyl chloride storage tank facilities, $C_2$-chlorinated hydrocarbon production facilities, etc. can be treated to reduce the concentration of such $C_2$-chlorinated hydrocarbons appreciably by the process of the present invention.

The concentration of $C_2$–$C_4$ halogenated, e.g., chlorinated, hydrocarbons in gas stream containing same, e.g., air streams can vary. Commonly, the concentration in air streams will be below or above the explosive range. For example, the concentration of vinyl chloride in air streams is typically maintained below 4 weight percent. It is contemplated therefore that the present process will find application to air streams that contain less than 4, e.g., less than 1 weight percent vinyl chloride. Further, the present process is useful for incineration of vinyl chloride at even low concentration levels, e.g., less than 0.05 weight percent (500 ppm) and even less than 0.01 weight percent (100 ppm). As the Examples illustrate, incineration of vinyl chloride and vinylidene chloride occurs even at concentrations less than 100 ppm, e.g., 50 ppm and 10 ppm. Thus the range of vinyl chloride concentrations can vary from about 0.0005 (5 ppm) to 4 weight percent, e.g., from about 0.001 (10 ppm) to 0.1 (1000 ppm), more usually from 0.001 to 0.05 weight percent. With good ventilation, a range of from 0.001 to 0.01 (100 ppm) weight percent vinyl chloride in the gas stream can be obtained. The aforesaid levels are considered applicable to the other $C_2$–$C_4$ halogenated hydrocarbons described herein or combinations of such halogenated hydrocarbons in gas streams.

In one application of the present invention, it is contemplated that vent gas streams containing $C_2$–$C_4$ halogenated, e.g., chlorinated, hydrocarbons such as vinyl chloride, e.g., vinyl chloride-containing air streams, will be dried to a low relative humidity, i.e., less than 5 percent, preferably less than about 2 percent, by absorption, adsorbtion, compression, cooling or compression and cooling. A simple and effective means for drying such a gas stream is to pass the gas through a drying column containing a solid or liquid desiccant, examples of which were previously described. The dried gas stream is then preheated to about 100° – 200° C. by low pressure waste steam and introduced into a catalyst bed, e.g., fixed or fluid, containing the cobalt oxide catalyst of the present invention along with an oxidizing amount of oxygen. The bed can also be heated by the low pressure waste steam. The effluent gas from the reactor can be scrubbed by conventional techniques to remove by-products hydrogen chloride gas, e.g., in a caustic scrubber, and the innocuous effluent gas from the scrubbing means utilized discharged in an evironmentally acceptable manner.

It is also contemplated that the metal oxides of the present invention can be used in protective breathing devices for individuals, e.g., a gas mask. The activity of the cobalt oxide of the present invention at ambient temperature, at least for short periods of time, may provide the time required for an individual to leave safely a contaminated area and reach a safety zone, i.e., a non-contaminated area. It is contemplated that any conventional gas mask can be modified to include an additional layer of the cobalt oxide of the present invention or such oxide can replace a catalytic material already contained in the gas mask, but not needed for the aforesaid application.

Typically, a gas mask comprises a cannister assembly (cylindrical or rectangular) having side walls, a lower lid and an upper lid at opposite ends of the cannister which are sealed to the cannister assembly by O-rings or other suitable sealing means. The lids contain air inlet and outlet means. Within the cannister are a plurality of spaced, parallel screen assemblies between which are layers of adsorbents and catalysts to remove objectionable vapors from the air passing through the cannister. Typically the first layer with which the incoming air is contacted is an activated charcoal followed by at least one layer of desiccant, e.g., caustic soda fused on pumice stone, fused calcium chloride, etc. Next, there can be placed the cobalt oxide of the present invention for the catalytic oxidation of $C_2$–$C_4$ halogenated hydrocarbon followed by a protective layer of desiccant to protect the oxide against moisture reaching it from above. Typically the individual layers of adsorbents and catalysts are separated by parallel wire screens which often contain filters, e.g., cotton wool filters. The air inlet conduit contains a check valve to allow air to pass in one direction, i.e., inwardly, and a filter to remove suspended solids included in the air intake. The air outlet is connected to a mouthpiece by means of hose means. The mouth piece can also be provided with one way air discharge means for removing exhaled air from the wearer of the mask.

Although the present process has been described with reference to specific details of certain embodiments thereof, it is not intended that such details should be regarded as limitations upon the scope of the invention except as and to the extent that they are included in the accompanying claims.

We claim:

1. A method for treating a $C_2$–$C_4$ halogenated hydrocarbon containing gas stream, said halogenated hydrocarbon being selected from the group consisting of chlorinated and brominated hydrocarbons, which comprises contacting the halogenated hydrocarbons with an oxidizing amount of oxygen-containing gas in the presence of hydrated cobalt oxide catalyst at temperatures within the range of from 20° to 500° C., for a time sufficient to reduce the halogenated hydrocarbon content of the gas stream, said temperature being such as to inhibit water-induced loss of catalyst activity.

2. The method of claim 1 wherein the halogenated hydrocarbon is vinyl chloride, vinylidene chloride, ethylene dichloride, 1,1,1-trichloroethane, 1,1,2-trichloroethane, trichloroethylene, perchloroethylene or mixtures of such halogenated hydrocarbons.

3. The method of claim 1 wherein the gas stream is an air stream.

4. The method of claim 3 wherein the gas stream contains from 0.0005 to 4 weight percent halogenated hydrocarbon.

5. The method of claim 1 wherein the temperature is from 50° to 300° C.

6. The method of claim 1 wherein the hydrated cobalt oxide is selected from the group consisting of cobalt (II) oxide, cobalt (III) oxide and cobalt (II, III) oxide.

7. The method of claim 1 wherein the relative humidity of the combined gas streams contacting the catalyst is less than 5 percent.

8. The method of claim 7 wherein the relative humidity is less than about 2 percent.

9. The method of claim 6 wherein the hydrated cobalt oxide contains water of hydration in an amount at least as high as that obtained by drying an aqueous filter cake of the precipitated cobalt oxide at 200° C.

10. A method for treating a $C_2$-chlorinated hydrocarbon containing air stream, which comprises contacting the chlorinated hydrocarbon with an oxidizing amount of oxygen at temperatures within the range of from 20° to 500° C. in the presence of hydrated cobalt oxide catalyst for a time sufficient to reduce the $C_2$-chlorinated hydrocarbon content of the air stream, said temperature being such as to inhibit water-induced loss of catalyst activity.

11. The method of claim 10 wherein the chlorinated hydrocarbon is vinyl chloride, vinylidene chloride, ethylene dichloride, 1,1,1-trichloroethane, 1,1,2-trichloroethane, trichloroethylene, perchloroethylene, or mixtures of such chlorinated hydrocarbons.

12. The method of claim 10 wherein the chlorinated hydrocarbon contains from 2 to 3 chlorine atoms.

13. The method of claim 11 wherein the relative humidity of the combined gas streams contacting the catalyst is less than 5 percent.

14. The method of claim 13 wherein the temperature is within the range of 20°–300° C.

15. The method of claim 13 wherein the hydrated cobalt oxide catalyst is cobalt (II) oxide, cobalt (III) oxide or cobalt (II, III) oxide.

16. A method for reducing the vinyl chloride content of a vinyl chloride-containing gas stream which comprises contacting the vinyl chloride of the gas stream with an oxidizing amount of oxygen-containing gas in the presence of hydrated cobalt oxide catalyst selected from the group consisting of cobalt (II) oxide, cobalt (III) oxide and cobalt (II, III) oxide at temperatures within the range 20° to 300° C. for a time sufficient to reduce the vinyl chloride content of the gas stream, said temperature being such as to inhibit water-induced loss of catalyst activity.

17. The method of claim 16 wherein the relative humidity of the combined gas streams contacting the catalyst is less than 5 percent.

18. The method of claim 16 wherein the vinyl chloride-containing gas stream is an air stream and the air stream has a relative humidity of less than 5 percent before contacting the cobalt oxide catalyst.

19. The method of claim 18 wherein the relative humidity of the air stream is less than 2 percent.

20. The method of claim 19 wherein the temperature is within the range of from 80° to 250° C.

21. The method of claim 16 wherein the total amount of oxygen-containing gas is at least that amount which is required to oxidize the carbon and hydrogen content of the vinyl chloride to carbon dioxide and water.

22. The method of claim 16 wherein the vinyl chloride content of the gas stream is from 0.001 to 0.1 weight percent.

* * * * *